United States Patent
Amini

(10) Patent No.: US 6,757,423 B1
(45) Date of Patent: Jun. 29, 2004

(54) METHODS OF PROCESSING TAGGED MRI DATA INDICATIVE OF TISSUE MOTION INCLUDING 4-D LV TISSUE TRACKING

(75) Inventor: Amir A. Amini, St. Louis, MO (US)

(73) Assignee: Barnes-Jewish Hospital, St. Louis, MO (US)

( * ) Notice: Subject to any disclaimer, the term of this patent is extended or adjusted under 35 U.S.C. 154(b) by 0 days.

(21) Appl. No.: 09/507,189

(22) Filed: Feb. 18, 2000

Related U.S. Application Data

(60) Provisional application No. 60/120,965, filed on Feb. 19, 1999, and provisional application No. 60/154,491, filed on Sep. 17, 1999.

(51) Int. Cl.⁷ .............................................. G06K 9/00
(52) U.S. Cl. ....................................... 382/154; 382/128
(58) Field of Search ................................ 382/154, 128, 382/131; 345/419, 427; 356/12, 39; 128/922; 250/455; 377/10

(56) References Cited

PUBLICATIONS

Cengizham Ozturk et al., Four Dimensional B–Spline Based Motion Analysis of Tagged Cardiac MR Images, SPIE Proceedings, 1999.*
Thomas S. Denney et al. Reconstruction of 3D Left Vintricular Motion Planner Tagged Cardiac MR Images: An Estimation Theoretic Approach, IEEE Transaction on Medical Imaging, 14(4), pp. 625–635, 1995.*

(List continued on next page.)

*Primary Examiner*—Samir Ahmed
(74) *Attorney, Agent, or Firm*—Sonnenschein Nath & Rosenthal LLP

(57) ABSTRACT

A method for tracking motion of tissue in three or four dimensions by obtaining a model from imaging data having tag planes from which a grid of control points may be defined. First, knot planes are calculated from the grid of control points of the imaging data. Next, the knot planes are fitted to the tag planes to obtain the model of the tissue. Next, motion of tissue in three or four dimensions is represented with the model of the tissue.

Also disclosed is a method for reconstructing tag surfaces with B-spline surfaces from imaging data having sets of image slices with tag data and calculating motion between the B-spline surfaces, comprising the steps of:
  reconstructing at least a first B-spline surface from B-spline curves corresponding to a first tag surface from a first set of image slices;
  reconstructing at least a second B-spline surface from B-spline curves corresponding to a second tag surface from a second set of image slices; and
  calculating motion between B-spline surfaces.

Also disclosed is a method for warping a first area in a first image slice of imaging data containing tag lines into a corresponding second area in a second image slice of imaging data successive in time to interpolate a dense displacement vector field using smoothing splines. First, find coordinates of the tag lines in both slices of imaging data. Next, reconstruct a dense displacement vector field with smoothing splines using coordinates of the tag lines. As a result, images indicating strain and images having indicators of tissue motion are provided.

13 Claims, 10 Drawing Sheets

OTHER PUBLICATIONS

P. Ravedaet al., Deformable B–Solids For SPAMM MRI analysis, Computer Vision and Image Understanding, vol. 66, No. 2, pp 163–178, 1997.*

A. Amini et al., "Coupled B–Snake Grids and Constrained Thin–Plate Splines for Analysis of 2–D Tissue Deformations from Tagged MRI", ,IEEE, 1998.*

A. Amini et al., "Snakes and Splines for Tracking Non–Rigid Heart Motion", In European Conference on Computer Vision, pp 256–261, University of Cambride, UK, 1996.*

A. Amini et al., "Energy–Minimizing Deformable Grids for Tracking MR Cardiac Images", In Computer in Cardiology, Durham, North Carolina, pp 651–654, 1992.*

J. Huang et al., "Anatomical Object Volumes from Deformable B–spline Surface Models", International Conference on Image Processing, Chicago, Illinios, 1998.*

* cited by examiner come from the intersections of this tag plane with all SA images

METHODS OF PROCESSING TAGGED MRI DATA INDICATIVE OF TISSUE MOTION INCLUDING 4-D LV TISSUE TRACKING

This application claims the benefit of Provisional application Ser. Nos. 60/120,965, filed Feb. 19, 1999 and 60/154,491, filed Sep. 17, 1999.

BACKGROUND OF THE INVENTION

1. Field of the Invention

The present invention relates to methods for determining indicators of tissue motion from imaging data obtained from imaged tissue. In particular, this invention relates to methods for determining a displacement vector field and other indicators of tissue motion from tagged magnetic resonance imaging (MRI) data obtained from imaging a left ventricle of a heart.

2. Description of the Prior Art

Noninvasive imaging techniques for assessing the dynamic behavior of the human heart are invaluable in the diagnosis of ischemic heart disease, as abnormalities in the myocardial motion sensitively reflect deficits in blood perfusion. MRI is a noninvasive imaging technique that provides superb anatomic information with excellent spatial resolution and soft tissue contrast. Conventional Magnetic Resonance (MR) studies of the heart provide accurate measures of global myocardial function, chamber volume, ejection fraction, and regional wall motions. In MR tagging, the magnetization property of selective material points in the myocardium are altered in order to create tagged patterns within a deforming body such as the heart muscle. The resulting pattern defines a time-varying curvilinear coordinate system on the underlying tissue. During tissue contractions, the grid patterns move, allowing for visual tracking of the grid intersections over time. The intrinsic high spatial and temporal resolutions of such myocardial analysis schemes provide unsurpassed information about local contraction and deformation in the myocardium which can be used to derive local strain and deformation indices from different regions.

Previous research in analysis of tagged images includes work by Young, Kraitchman, Dougherty, and Axel who adopted an analysis system for tagged images based on snakes. Once the tag positions on the myocardium are found, coordinates of these points in deformed images are determined within a volumetric finite element model fitted to endocardial and epicardial contours. The work of Park, Metaxas, and Axel considers geometric primitives which are generalization of volumetric ellipsoids, through use of parameter functions which allow for spatial variations of aspect ratios of the model along the long axis (LA) of the LV. This model is specially useful for computing the twisting motion of the heart. Prince and McVeigh, and Gupta and Prince developed optical flow based approaches for analysis of tagged MR images. The approach of Guttman, Prince, and McVeigh for analysis of radial tagged images is to use a graph-search technique that determines the optimal inner and outer boundaries of the myocardium as well as tag lines by finding points one after the other in a sequence, using initial search starting points on the determined LV boundaries.

Denney and McVeigh presented a technique for reconstructing a three-dimensional myocardial strain map using the discrete model-free (DMF) algorithm, which decomposes the myocardial volume into a finely spaced mesh of points and reconstructs a three-dimensional displacement and strain fields based on local incompressibility and first order displacement smoothness. Moulton, et al., developed a method for approximating continuous smooth distributions of finite strains in the left ventricle from the deformations of MRI tissue tags. A 3-D displacement field on tag surfaces is extracted using sets of MR images and employing spline surface interpolation, followed by a global polynomial fit for determining 3-D displacements, and regional strains between the reference and deformed states.

O'Dell, et al., used images from three sequences of parallel tags from segmented k-space imaging obtained at different times. The least squares fitting of a truncated power series in the prolate spheroidal coordinate system on the whole of the myocardium is performed in order to measure dense displacements.

However, there is a need for a method which uses all of the extracted tag information. There is also a need for a method which performs B-spline interpolation over 3-D space and time simultaneously. There is also a need for a method which uses polynomial basis functions with local support for better interpolation properties as opposed to approaches which make use of global polynomial fits. There is also a need for a method which accurately captures the movement of each myocardial point over time. In addition, there is a need for a method which can obtain the shape of the left-ventricle at any time instant. There is also a need for a method which provides for fast computation of tag surfaces intersecting individual slices. There is also a need for a method which leads to an easy implementation algorithm for computing 3-D material points. There is also a need for a method which allows reconstruction of dense deformations between two arbitrary frames in a sequence of tagged images. There is also a need for a method which can obtain the change of strain over time at all myocardial points.

SUMMARY OF THE INVENTION

It is an object of this invention to provide a method of processing images generated from MRI data of moving tissue which method provides a less subjective assessment.

It is an object of this invention to provide a method of processing images generated from tagged MRI data of moving tissue which method, in the case of tagged MRI, provides visualization and measurement of motion at points between tag intersections.

It is an object of this invention to provide a method of processing images generated from tagged MRI data of moving tissue which method is fast and efficient.

It is an object of this invention to provide a method of processing images generated from tagged MRI data of moving tissue which method uses all of the available tag information in reconstructing dense motion fields.

It is an object of this invention to provide a method of processing images generated from tagged MRI data of moving tissue which method provides a way of extracting positions of non-invasively placed beads with MRI in the tissue.

It is an object of this invention to provide a method of processing images generated from tagged MRI data of moving tissue which method, in the case of motion of cardiac tissue, reveals motion of the beads for all time points imaged during the cardiac cycle.

It is also an object of this invention to provide such methods for use in fitting knot planes to tag planes and, once fit, for doing B-spline summations at various time intervals beginning with the initial interval at the onset of tags as indicated by an electrocardiogram for recovering cardiac tissue motion.

It is also an object of this invention to provide such methods for use in assessing left ventricular function from MRI and for use in other applications where one can image moving tissue in-vivo with tagged MRI.

It is also an object of this invention to provide such methods for use in assessing left ventricular function from tagged MRI.

It is also an object of the invention to provide a 4-D model that achieves in a single step 3-D material point localization and displacement reconstruction.

It is also an object of the invention to provide a mechanism for in-vivo measurement of tissue motion and strain.

In one form, the invention comprises a method for tracking motion of tissue in three or more dimensions by obtaining a model from imaging data from which a grid of control points may be defined. The imaging data has tag planes. The method comprises the steps of:

calculating knot planes from the grid of control points of the imaging data;

fitting the knot planes to the tag planes to obtain the model of the tissue; and representing motion of tissue in three dimensions with the model of the tissue.

In another form, the invention comprises a method for representing indicators of tissue motion with a B-spline model from imaging data. The imaging data has tag planes. The method comprises the steps of:

defining displacement vectors corresponding to the tag planes;

fitting the B-spline model to the defined displacement vectors; and deriving indicators of tissue motion from the fitted B-spline model.

In another form, the invention comprises method for reconstructing tag surfaces with B-spline surfaces from imaging data having sets of image slices with tag data and calculating motion between the B-spline surfaces. The method comprises the steps of:

reconstructing at least a first B-spline surface from a first spatial stack of B-spline curves corresponding to a first tag surface from a first set of image slices;

reconstructing at least a second B-spline surface from a second spatial stack of B-spline curves corresponding to a second tag surface from a second set of image slices; and calculating motion between B-spline surfaces.

In another form, the invention comprises a method for warping a first area in a first image slice of imaging data into a corresponding second area in a second image slice of imaging data successive in time to interpolate a dense displacement vector field using smoothing splines. The imaging data contains tag lines. The method comprises the steps of:

finding coordinates of the tag lines in both slices of imaging data; and reconstructing a dense displacement vector field with smoothing splines using coordinates of the tag lines.

Other objects and features will be in part apparent and in part pointed out hereinafter.

BRIEF DESCRIPTION OF THE DRAWINGS

In FIG. 1A, the set of tag lines referred to by reference character 1 are the intersections of tag planes in direction 1 with SA image planes. In FIG. 1A, the set of tag lines referred to by reference character 2 are the intersections of tag planes in direction 2 with the SA image planes. In FIG. 1B, the set of tag lines referred to by reference character 3 are the intersections of tag planes in direction 3 with LA image planes.

FIG. 3A illustrates the initial position. FIG. 3B is an illustration after two (2) iterations. FIG. 3C is an illustration after five (5) iterations. FIG. 3D is an illustration of the final position.

FIG. 6A shows the initial 3-D location of material points shown on every second slice of the MRI data. FIG. 6B shows the location of the material points for every fourth slice of the MRI data. FIG. 6C shows the new computed location of material points one-third through systole. In combination, these FIGS. 6A–6C illustrate the non-rigid motion of material points of the heart and indicate that points further up in slices (around the base) move downward, whereas points near the heart's apex are relatively stationary.

FIG. 7 shows that segmental motion of all myocardial points can easily be quantitated and visualized from the location, direction and length of the displayed vectors. An akinetic area in the upper left area is indicated.

FIG. 8A is an undeformed MRI image slice (slice 0, frame 0) of a pig's LV in short axis orientation at baseline. FIG. 8B illustrates the deformed slice (slice 0, frame 11) corresponding to FIG. 8A. FIG. 8C is a 2-D projection of the 3-D reconstructed motion field corresponding to the slice 0, frame 0 material points.

Figure 1B:
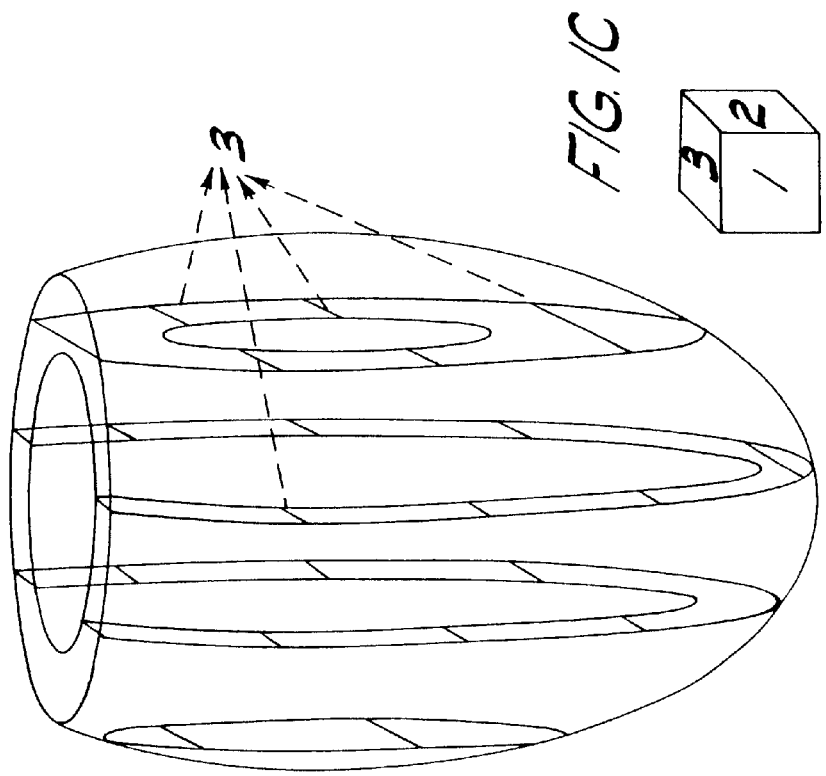
FIGS. 1A–1C illustrate three orthogonal sequences of tag planes representing the imaging protocol for SPAMM-MRI. The directions for three orthogonal sequences of tag planes are represented by reference characters 1, 2, 3 on the cube of FIG. 1C.

Those skilled in the art will note that the drawings are not to scale and certain shapes and volumes have been enlarged for viewing convenience.

DETAILED DESCRIPTION OF PREFERRED EMBODIMENTS

In general, one method of the invention represents indicators of tissue motion with a B-spline model from imaging data by using displacement vectors. The indicators of motion include a display of beads derived from tag planes corresponding to material points of the tissue, a display of the vector field, a display of the strain field, or a display of the B-spline surface. Another method of the invention warps areas in the imaging data to interpolate dense displacement vector fields using smoothing splines.

METHOD OF OPERATION

In operation, one method of the invention includes the step of deriving indicators of tissue motion in three primary steps. The "deriving" step includes interpolating, reconstructing, or representing. The imaged tissue includes tissue of the heart, skeletal muscles, and other tissues which would benefit from the imaging methods and processing described herein. The tissue motion can be represented discretely in three dimensional space or continuously in four dimensions (three dimensional space over time). First, imaging data containing tag data from an imaging apparatus as described above is obtained. One imaging apparatus for obtaining tagged images is a magnetic resonance imaging (MRI) unit having a spatial modulation of magnetization (SPAMM) pulse sequence.

A typical imaging protocol for obtaining tagged images uses a SPAMM pulse sequence for imaging the left ventricle of the heart. Multiple images in both short-axis and long axis views of the heart are collected to cover the entire volume without gaps. Immediately after the ECG trigger, rf tagging pulses are applied in two orthogonal directions. The repetition time (TR) of the imaging sequence is approximately 7.1 msec, the echo time (TE) is 2.9 msec, the rf pulse flip angle is 15 degrees, and the time extent of rf tag pulses is 22 msec. Echo sharing is used in collecting each time-varying image sequence for given slice position (called a Cine sequence). Five data lines are collected for any time frame during each heart cycle, but two data lines are overlapped between two consecutive cardiac frames, resulting in an effective temporal resolution of approximately 22 msec. Other imaging parameters are: field of view=330 mm, data acquisition matrix size=160×256 (phase encoding by readout), in-plane resolution=2.1×1.3 $mm^2$, slice thickness=7 mm, and tag spacing=7 mm. The total imaging time is therefore 32 heart beats for each Cine sequence, and the subject is instructed to breathe only following each Cine acquisition. Since there are 19 volumetric temporal frames and 17 spatial slices in each image volume, all of the images are acquired in 544 heartbeats. In the long-axis view, there are also 19 temporal frames. However, 13 slices covered the entire heart in this case resulting in 416 heart beats of total imaging time.

B-splines are suitable for representing a variety of industrial and anatomical shapes. Three advantages of B-spline representations are as follows. (1) They are smooth, continuous parametric curves which can represent open or closed curves. For this application, due to parametric continuity, B-splines will allow for sub-pixel localization of tags, (2) B-splines are completely specified by few control points, and (3) individual movement of control points will only affect their shape locally. In medical imaging, local tissue deformations can easily be captured by movement of individual control points without affecting static portions of the curve.

The method of the invention for representing indicators of tissue motion models the imaging data in two, three, or four dimensions. For two dimensional modeling, the imaging data contains tag lines and the B-spline model is a two-dimensional curve. For three dimensional modeling, the imaging data contains tag planes and the B-spline model is a three-dimensional surface. For four dimensional modeling, the imaging data contains tag planes deforming in time and the B-spline model represents a three-dimensional volume over time. Modeling in different dimensions employs the same overall methods described herein. For simplicity, the four dimensional method is described, followed by an explanation of how the two- and three-dimensional equations would differ in their final result.

One method of the invention represents indicators of tissue motion with a B-spline model by initially defining displacement vectors corresponding to the tag data in the imaging data. The imaging data is acquired over a time interval. The next step is fitting the B-spline model to the defined displacement vectors to obtain a displacement vector field for the entire time interval. Indicators of tissue motion are then derived from the fitted B-spline model.

To define the displacement vectors from the tag data in the imaging data, two successive tag lines in the tag data are compared. The distances between the tag points of an initial undeformed tag plane and the tag points of a successive deformed tag plane define the initial displacement vectors. A tensor product B-spline model is then fit to the defined displacement vectors using a least squares method. In the tensor product B-spline model, the coefficients of the B-spline model equation correspond to the unknown control points for which the equation is to be solved. The equation is optimized using numerical methods to obtain the coefficients. From this B-spline model, indicators of tissue motion can be derived by obtaining the displacement vectors for any instant in the sampled time interval.

This method of the invention represents indicators of tissue motion with a B-spline model fitted to initial displacement vectors corresponding to the tag data in the imaging data. The imaging data is acquired over a time interval from t1 to t2. A B-spline model is then fit to the available displacement vectors to obtain a displacement vector field for the entire time interval. Indicators of tissue motion are then derived from the B-spline model at any instant in the time interval beginning with time t1 and ending with time t2.

Another method of the invention utilizes a knot solid to represent each frame of imaging data and utilizes three sequences of solid knot planes to detect three sequences of LV tag planes in order to obtain a 4-D object (3-D B-solid+ 1D B-spline interpolation over time). To fit a deformable B-spline model to the LV of the heart, an adaptive conjugate gradient descent method optimizes an objective function encoding the distance between model knot planes and MRI tag planes leading to the minimum quickly and accurately. Once the 4-D model (a function of u, v, w, t) is able to generate a B-solid (a function of u, v, w) which varies continuously over time t, a 3-D displacement motion field between any two time instants is immediately available. This vector field can be displayed to indicate tissue motion by projecting the 3-D motion field onto a 2-D plane for viewing. Further, material points (corresponding to a grid of control points) can be displayed over time to generate a "movie" to illustrate the control points movements in three dimensions over time, which movements represent tissue motion. In addition, the B-spline model can be displayed as a visual indicator of the shape of the tissue at any time instant during the interval in which the tissue is imaged. In the case of imaging the left ventricle of the heart, the epicardial and endocardial boundaries of the left ventricle can be displayed.

In a 4-D B-spline model, knot lines and knot planes are temporal functions. The 3-D solid captured at each knot time instant is called a knot solid. A tensor product 4-D B-spline model is expressed as:

$$S(u, v, w, t) = \sum_{i=1}^{I}\sum_{j=1}^{J}\sum_{k=1}^{K}\sum_{l=1}^{L} p_{ijkl}N_i(u)N_j(v)N_k(w)N_l(t) \quad (1)$$

where (I×J×K×L) is the total number of model control points and $N_i(u)$, $N_j(v)$, $N_k(w)$, $N_l(t)$ are B-spline basis functions which blend control points $P_{ijkl}$.

By changing the order of B-spline summation, a more efficient approach to computation of the B-spline model will result. Given a fixed time instant t*, a 3-D grid of control points is specified that determines the 3-D solid at t*. To compute the solid at t*, start with calculating the u=u* isoparametric planes. This is implemented in two steps. First, the u=u* points (cross-marked points) for the B-spline curves (the thick lines) in the u direction are calculated. That is, all points with u=u* value along the B-spline curves specified by each thread of control points in the u direction are calculated. Then, each B-spline surface from corresponding points (i.e, all points having the same u=u* value) on these curves is calculated, obtaining the u=u* isoparametric planes. This procedure may be mathematically stated as:

$$S(u^*, v, w, t^*) = \sum_{l=1}^{L}\left(\sum_{k=1}^{K}\sum_{j=1}^{J} N_j(v)N_k(w)\left(\sum_{i=1}^{I} p_{ijkl}N_i(u^*)\right)\right)N_l(t^*) \quad (2)$$

Once the isoparametric plane S(u*,v,w,t*) is computed, the entire model at time instant t* is obtained by continuously varying u*. This method dissolves a 4-D tensor product into a series of one-dimensional (1D) or two-dimensional (2-D) B-splines which are implemented by multiplications of small nonsparse matrices. Thus, Eq. (2) simplifies computation of the time-varying solid without the need to use banded/block matrix storage and multiplication routines. The same principle can be applied to other higher dimensional tensor product to degrade the computation into simpler, lower dimensional matrix multiplications.

Figure 1C:
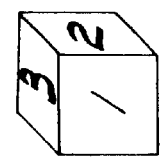
Figure 1A:
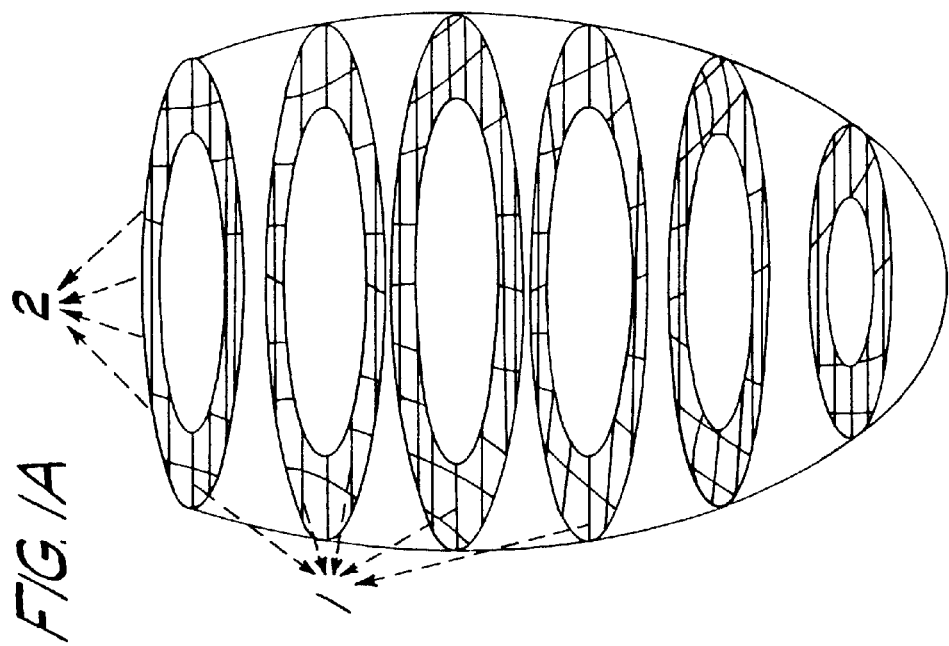

A typical imaging protocol is shown in FIGS. 1A–1C. In particular, FIGS. 1A–1C illustrate three orthogonal sequences of tag planes representing the imaging protocol. The directions for three orthogonal sequences of tag planes are represented by reference characters 1, 2, 3 on the cube of FIG. 1C. In FIG. 1A, the set of tag lines referred to by reference character 1 are the intersections of tag planes in direction 1 with SA image planes. In FIG. 1A, the set of tag lines referred to by reference character 2 are the intersections of tag planes in direction 2 with the SA image planes. In FIG. 1B, the set of tag lines referred to by reference character 3 are the intersections of tag planes in direction 3 with LA image planes.

The tag lines on SA and LA images are formed by intersecting image slices with one or two orthogonal sequences of tag planes. From the tag lines on SA and LA images, the shape of three orthogonal sequences of tag planes at each time frame can be reconstructed. The direction for each sequence of tag planes is shown in FIGS. 1A–1C. In the B-spline model, there is one temporal sequence of knot solids and each knot solid contains three orthogonal sequences of knot planes. Since SA and LA volumetric frames of MRI data will include three orthogonal sequences of tag planes, if each knot solid is fit to each time frame by matching each knot plane to its corresponding tag plane, the model will then automatically interpolate the volumetric deformations of the LV continuously over time.

Figure 2:
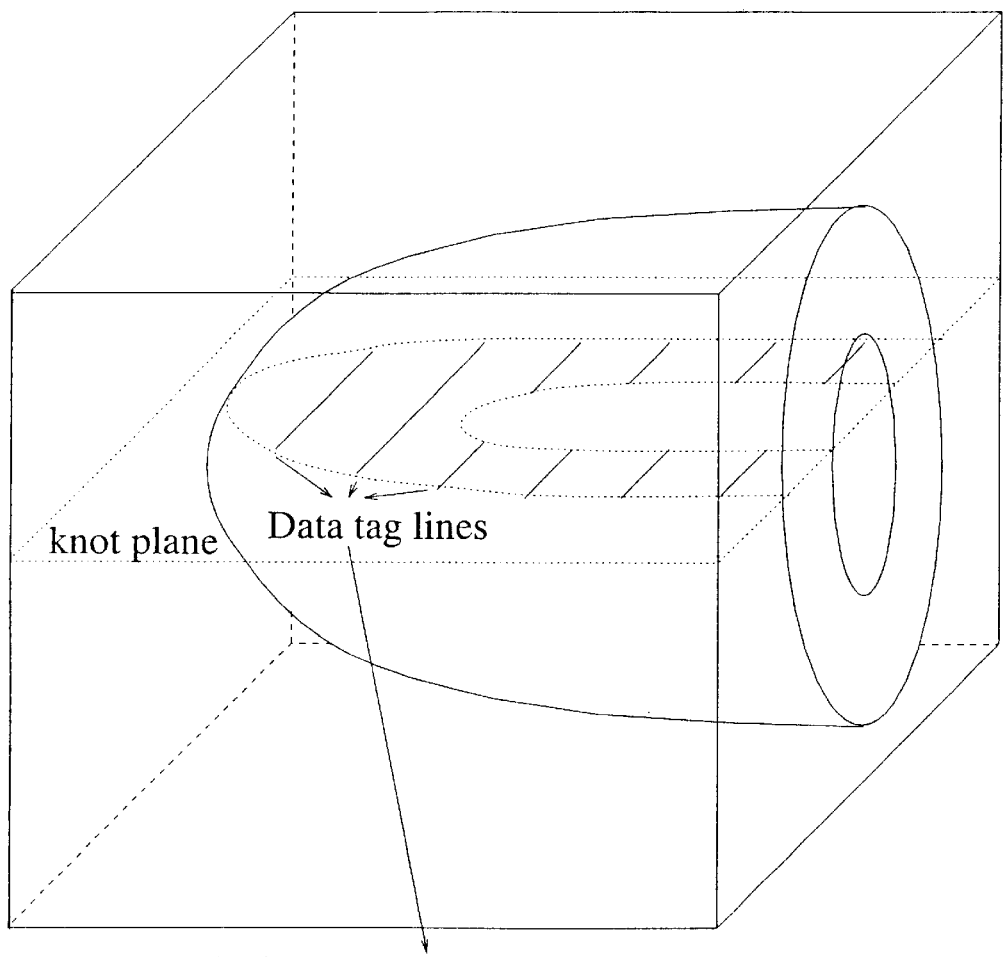
FIG. 2 is a side view illustration of one model knot plane fitting a group of tag lines belonging to one tag plane of the left ventricle of the heart.

This fitting process is illustrated in FIG. 2 where a sequence of knot solids is fit to frames of tag data. In particular, FIG. 2 is a side view illustration of one model knot plane fitting a group of tag lines belonging to one tag plane of the left ventricle of the heart.

The Chamfer distance potential is employed to build an objective function for fitting the tag planes. In general, if edge or line features can be extracted reliably, Chamfer distance potential is a good choice for obtaining fits. Chamfer distance is the Euclidean distance from each model point to the nearest target point, denoted by C $$C(S,t)=\text{Dist}(S,c(t))$$

where c is the closest target point to the model point S. c(t) means the target is a function of time, and C(S,t) is the 4-D Chamfer distance. After the object contour is extracted, a binary target image is generated by setting all image voxels on the contour to zero and setting all other voxels to one.

The Chamfer distance image [also called the potential image or potential function] is an image in which every voxel value stores that voxel's distance to the closest object target point. It is clear that in this image, target points have zero values, and hence are darkest. The advantage of building the Chamfer distance potential image is that every voxel value is calculated only once, off line, prior to model fitting. When the model deforms during an iterative fitting process, the Chamfer distance of each model point is immediately available without any additional computations:

$$C(S,t)=C(x,t)|_{x=S}$$

where C(x,t) is the 4-D Chamfer distance image.

In the optimization process, each B-spline model knot plane is interactively fit to its corresponding LV tag plane. A potential problem in the mapping of an array of knot planes to array of tag planes is the possible confusion which may be brought about in the registration of plane pairs. The potential function is split to surmount this problem. For n tag planes, n separate 4-D potential functions are generated and the ith potential function for attracting the ith knot plane is computed solely from the ith tag plane. All three tag orientations in the model are processed in the same manner. The split potential functions attract corresponding knot planes. Hence, by splitting the potential function, errorless registration between model knot planes and LV tag planes is realized.

The total energy for the model is defined as the sum of the energy of each knot solid which is defined by summing the energy of each knot plane. The energy of each knot plane is further defined as the integral of the corresponding split potential function over the knot plane surface. Thus the total energy for the model can be expressed as:

$$E = \sum_{t=1}^{T_m}\left(\sum_{u=1}^{U_m}\int\int C_u(S(u,v,w,t))dvdw + \sum_{v=1}^{V_m}\int\int C_v(S(u,v,w,t))dudw + \sum_{w=1}^{W_m}\int\int C_w(S(u,v,w,t))dudv\right)$$

where $C_u$, $C_v$, $C_w$ are used to denote the 4-D split Chamfer distance potentials and $U_m$, $V_m$, $W_m$, and $T_m$ are the maximum knot values. It should be noted that although the potential functions are split, all knot planes are simultaneously optimized. The adaptive conjugate gradient descent method is used which shortens the step length prior to taking a step in the search direction that passes over the minimum point. The process halts if the step length is less than a threshold.

The model is based on a 4-D grid of control points and the total energy of the model is a function of all control points. Each control point contributes to a few frames of data (in time) and a few nearby tag planes (in space), i.e., each control point determines the local position and movement of myocardial points in k knot interval (k being the order of the B-spline). Conversely, each myocardial point and its movement over time are determined by k control points in each direction.

In the fitting process, an additional constraint is considered. To fit one knot plane to a tag plane, all related control points are constrained to move in the normal direction to the tag plane so as to drag the knot plane towards its corresponding tag plane. In the ideal case, the tag plane is infinitely large, and as a result, the attracting force (or negative potential gradient) is uniform and only in the normal direction. In the actual case, the tag plane consists of a set of sparse tag lines and is limited to an area which is generally smaller than the knot plane. Since each knot plane point is attracted towards the closest tag line point, an undesirable shrinking effect may result which can be prevented by projecting the attracting force into the normal direction of the tag plane. Since each tag plane applies a force to nearby control points in its normal direction, three sets of orthogonal and nearby tag planes determine the displacements of a given control point in 3-D space. In addition, the sequence of image frames determines the temporal movement of control points, generating a 3-D time-varying grid of control points. In each fitting iteration, when the system moves all control points in four dimensions, the entire model is optimized simultaneously for all frames of data.

Figure 3A:
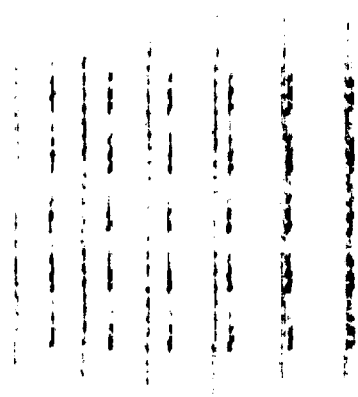
FIGS. 3A–3D are side views of iterations in fitting a set of knot planes to a set of tag planes.
Figure 3B:
Figure 3C:
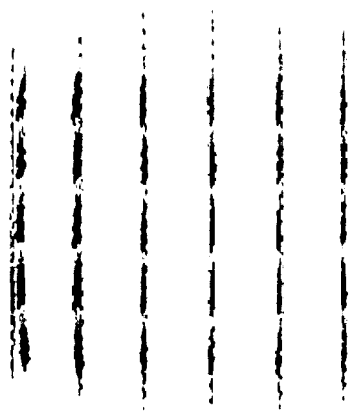
Figure 3D:
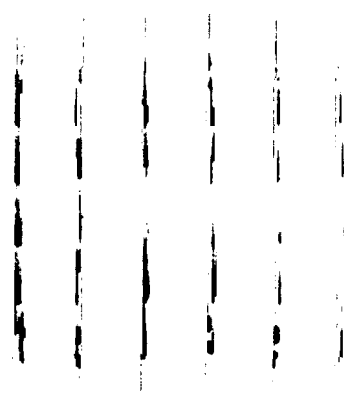
Figure 4:
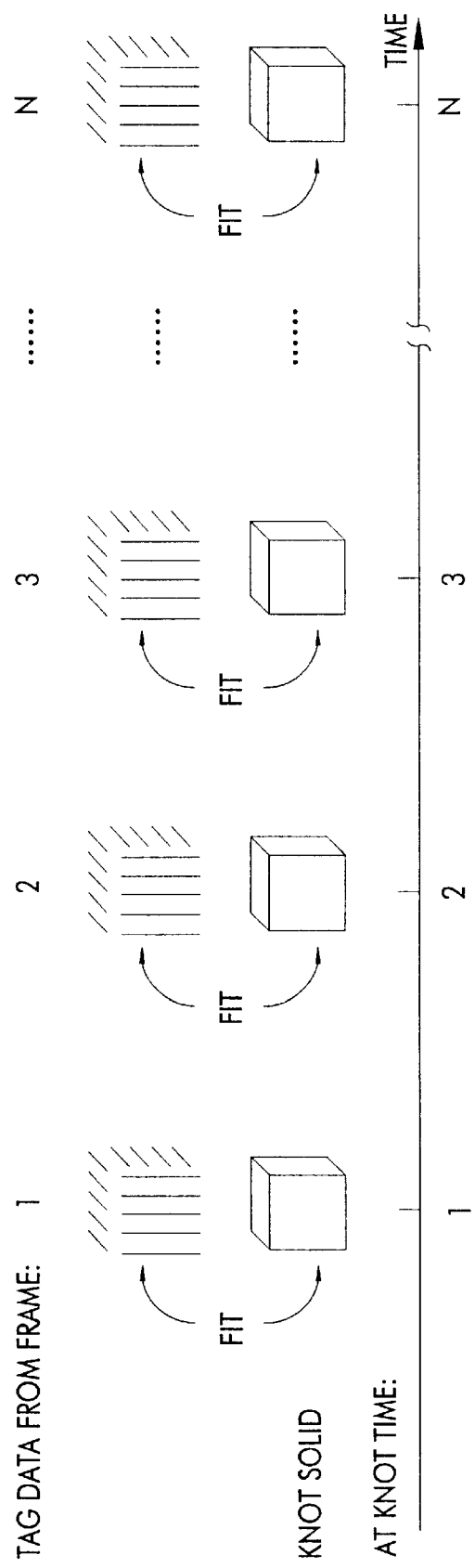
FIG. 4 is an illustration of knot solids simultaneously fitting a temporal frame sequence of data where the data includes three orthogonal sequences of tag planes.

The fitting process for one sequence of tag planes is shown in FIGS. 3A–3D and 4. The other two sequences are similar. FIGS. 3A–3D are side views of iterations in fitting a set of knot planes to a set of tag planes. FIG. 3A illustrates the initial position. FIG. 3B is an illustration after two (2) iterations. FIG. 3C is an illustration after five (5) iterations. FIG. 3D is an illustration of the final position. FIG. 4 is an illustration of knot solids simultaneously fitting a temporal frame sequence of data where the data includes three orthogonal sequences of tag planes. FIG. 3A shows the initial position of tag planes and knot planes. Each vertical line is the intersection of a plane with the paper. The set of shorter lines which appear textured are the knot planes. Each fitting iteration for 3 sequences of knot planes takes about 2.8 seconds. The solid fitting algorithm converges in about 30 iterations to FIG. 3D. Therefore, the total fitting process for this example approximately took 84 seconds on a 296 Mhz Sun Ultra 30 platform.

An important byproduct of the approach is that at the conclusion of fitting knot planes to tag planes, S(u,v,w,t) is determined. Given two solids $S(u,v,w,t_0)$ and $S(u,v,w,t_1)$ at two time instants, a 3-D B-spline interpolated motion field is generated by employing the computation in Eq. (3):

$$V(u,v,w)=S(u,v,w,t_1)-S(u,v,w,t_0) \quad (3)$$

For the discrete three dimensional version of the method, given two solids $S_0(u,v,w)$ and $S_1(u,v,w)$, a 3-D B-spline interpolated motion field is generated by employing the computation in Eq. (4):

$$V(u,v,w)=S_1(u,v,w)-S_0(u,v,w) \quad (4)$$

For the discrete two dimensional version of the method, given two surfaces $S_0(u,v)$ and $S_1(u,v)$ fitted to two short axis tagged slices, a 2-D B-spline interpolated motion field is generated by employing the computation in the following Eq. (5) instead of Eq. (4):

$$V(u,v)=S_1(u,v)-S_0(u,v) \quad (5)$$

A quadric-quadric-quadric-quadric B-spline model is adopted to perform validations. The method discussed below is employed to detect tag lines by optimizing deformable B-spline grids. The energy function whose minimum is sought, is a linear combination of intensity points along the parametrized grid in the image and the SSD (sum-of-squared-differences) values around tag intersections for tracking interframe motion. Once the tag lines in SA and LA images are extracted and grouped by each tag plane, 4-D split Chamfer distance potentials are created. The 4-D model then deforms in the potential field under the plane constraint. Finally, 3-D motion fields are generated and visualized. The computational speed of fitting is 4.86 ms per control point per iteration on a Sun Ultra 30/300 platform. For example, for a set of data containing 7×7×8 tag planes and six frames, an 8×8×9×7 grid of control points (quadric B-spline) is used. The fitting algorithm converged in 30 iterations. Therefore, the total fitting process took approximately $4.86 \times 10^{-3} \times 8 \times 8 \times 9 \times 7 \times 30 = 588$ s.

Figure 8A:
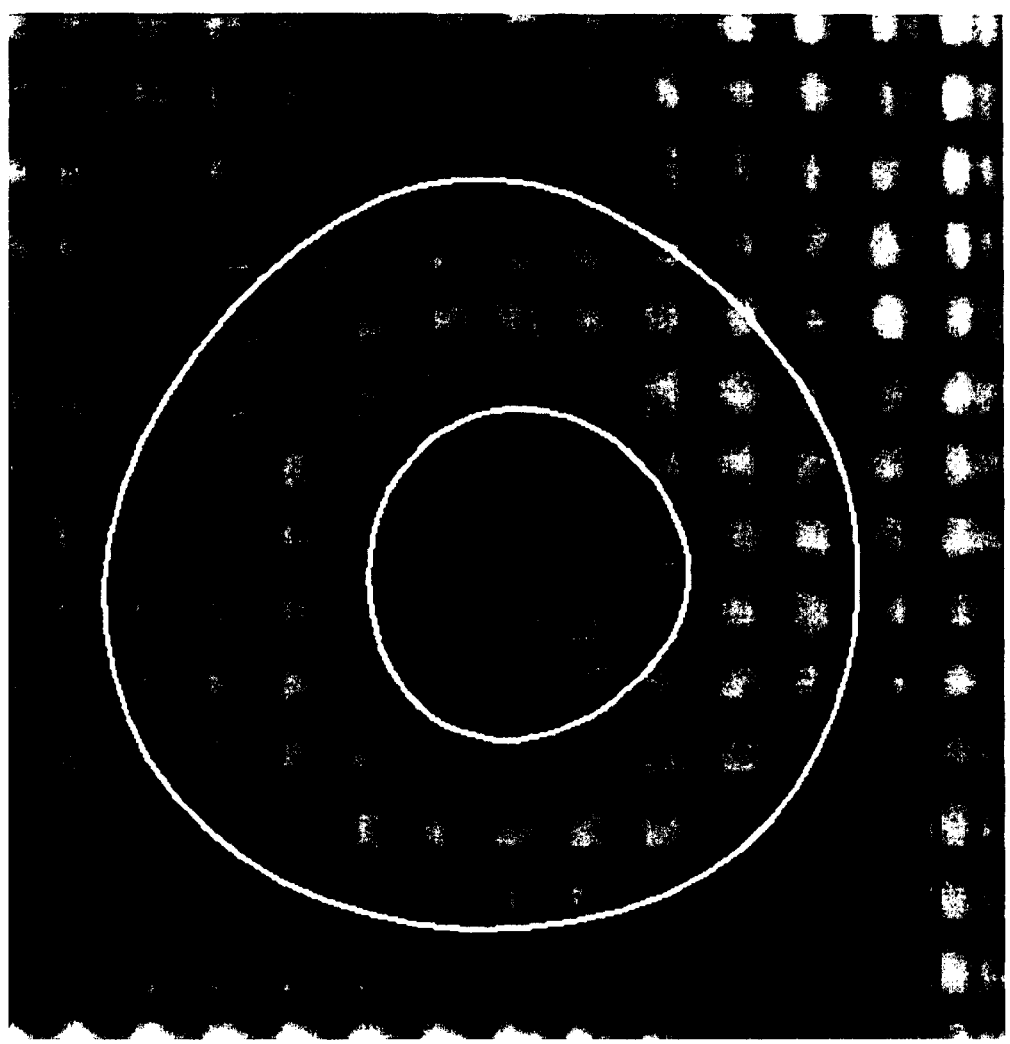
FIGS. 8A–8C illustrate images collected from a pig at baseline and after induction of posterolateral myocardial infarction in the short axis (SA) orientation.
Figure 8B:
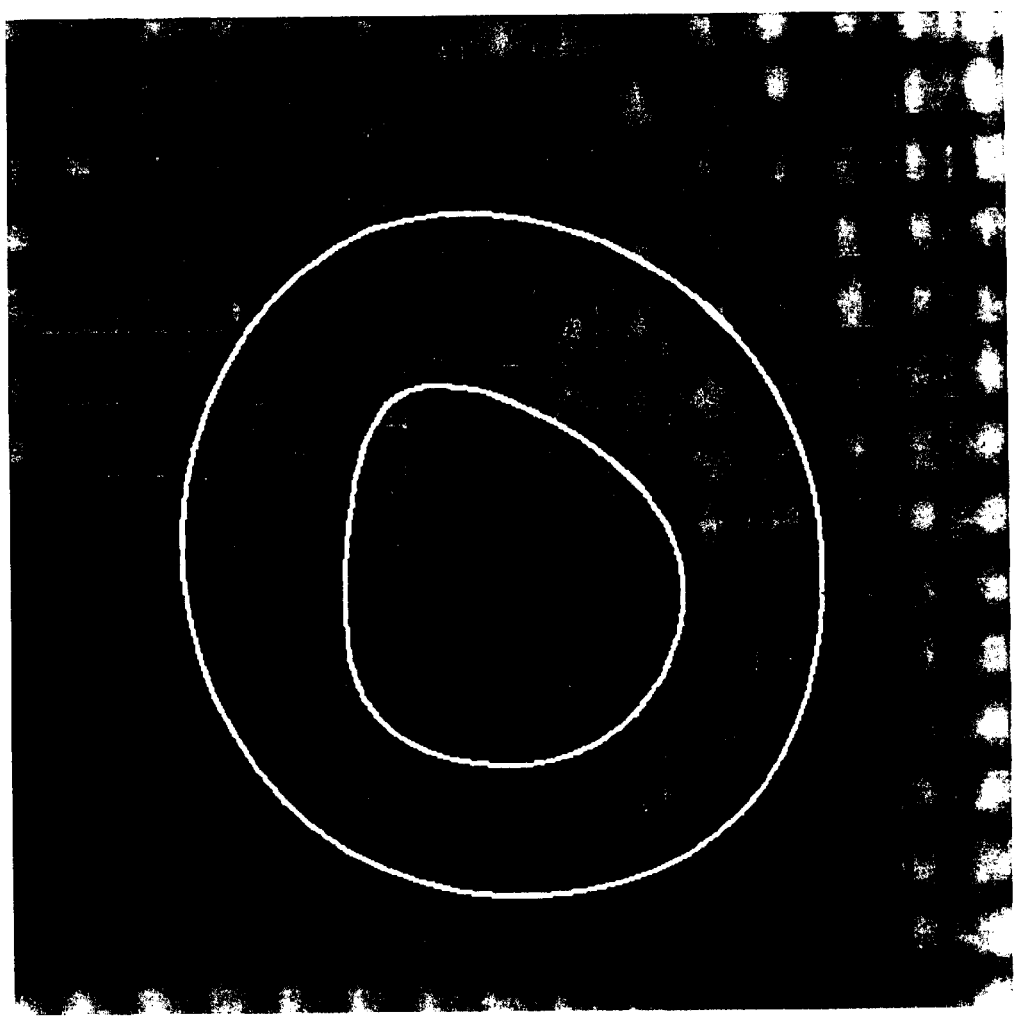
Figure 8C:
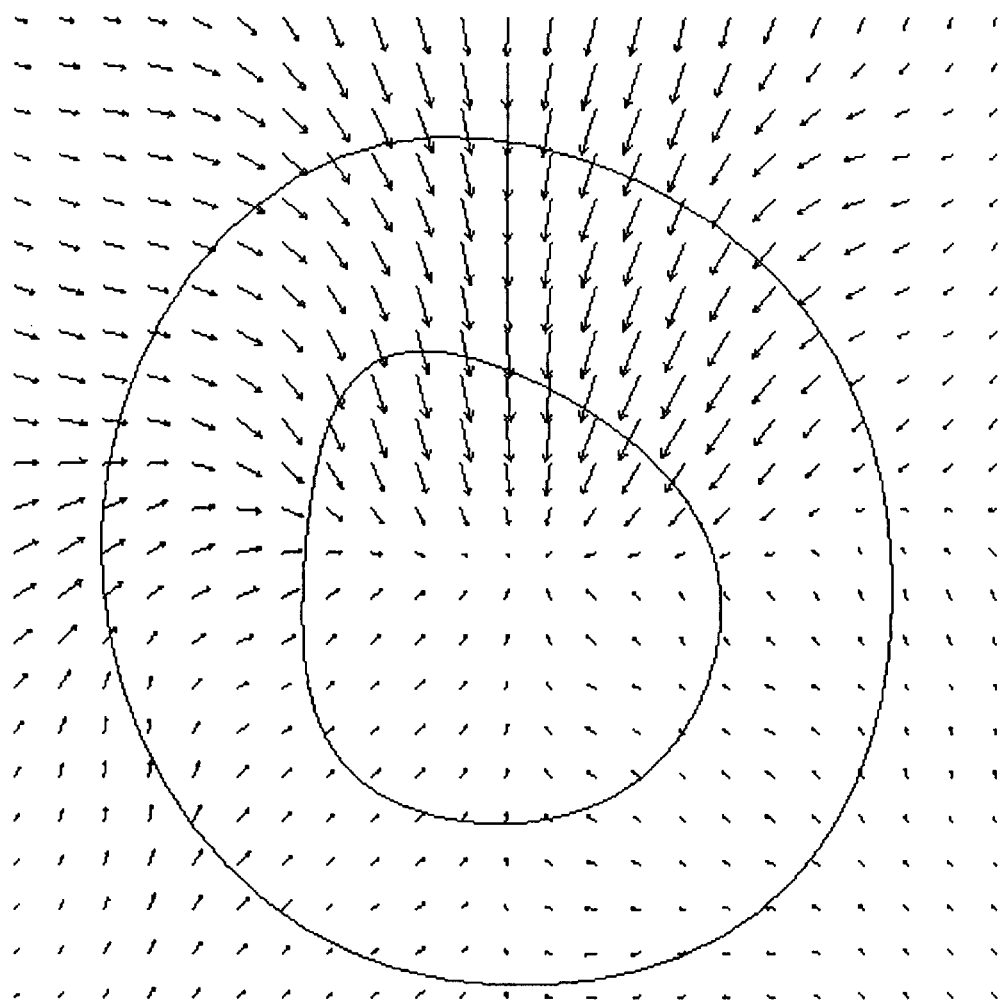

FIGS. 8A–8C illustrate the results of applying the above method to images collected from a pig at baseline and after induction of posterolateral myocardial infarction in the short axis orientation. FIG. 8A is an undeformed MRI image slice (slice 0, frame 0) of a pig's LV in short axis orientation at baseline. FIG. 8B illustrates the deformed slice (slice 0, frame 11) corresponding to FIG. 8A. FIG. 8C is a 2-D projection of the 3-D reconstructed motion field corresponding to the slice 0, frame 0 material points. The displayed motion fields of FIG. 8C correspond to the optimized B-spline model at frame 11 and are compared relative to the model at frame 0. The image acquisition strategy avoids the need for model fitting in frame 0.

In another method of the invention, computation of a three dimensional volumetric B-spline model is not necessary to reconstruct a tag surface from the imaging data. Instead, a tag surface is represented by a B-spline surface. From the B-spline surface representations of the three intersecting tag surfaces, coordinates of material points can be determined. The coordinates of the material points can be determined for successive image frames and displayed in a temporal sequence to visualize motion of the tissue. In particular, the method for reconstructing tag surfaces with B-spline surfaces from imaging data having sets of image slices with tag data and calculating motion between the B-spline surfaces, comprises the steps of:

reconstructing at least a first B-spline surface from a first spatial stack of B-spline curves corresponding to a first tag surface from a first set of image slices;

reconstructing at least a second B-spline surface from a second spatial stack of B-spline curves corresponding to a second tag surface from a second set of image slices; and calculating motion between B-spline surfaces.

As noted above, B-splines are suitable for representing a variety of industrial and anatomical shapes. Three advantages of B-spline representations are as follows. (1) They are smooth, continuous parametric curves which can represent open or closed curves. For this application, due to parametric continuity, B-splines will allow for sub-pixel localization of tags, (2) B-splines are completely specified by few control points, and (3) individual movement of control points will only affect their shape locally. In medical imaging, local tissue deformations can easily be captured by movement of individual control points without affecting static portions of the curve.

A B-spline curve is expressed as $$\vec{\alpha}(u) = \sum_{i=0}^{N-1} \vec{V}_i B_i(u)$$

where $B_i(u)$ are the B-spline basis functions having polynomial form, and local support, and $\vec{V}_i$ are the sequence of control point of the B-spline curve. Two remarks should be made regarding the sequence of control points: a) The number of control points is much fewer in number than a sampling of the curve $\alpha(u)$ on a pixel grid, and (b) $\vec{V}_i$ rarely reside on the actual curve. To localize a tag line based on B-snakes, an external energy can be defined and optimized in order to locate feature points on individual image slices. Given a spatial stack of m curves on m image slices, each represented by n control points, a matrix of control points is constructed as follows:

$$\begin{bmatrix} \vec{V}_{11} & \cdots & \vec{V}_{1n} \\ & \cdots & \\ \vec{V}_{m1} & \cdots & \vec{V}_{mn} \end{bmatrix}$$

where the second index may denote ordering along the x axis, and the first index may denote ordering along the z axis (image slices). The matrix immediately gives rise to the surface $$\vec{S}(u,v) = \sum_{ij} \vec{V}_{ij} B_{i,k}(u) B_{j,k}(v)$$

where non-periodic blending functions are used, as defined in with $t_i$'s as the knot sequence:

$$B_{i,k}(u) = \frac{(u-t_i)B_{i,k-1}(u)}{t_{i+k-1}-t_i} + \frac{(t_{i+k}-u)B_{i+1,k-1}(u)}{t_{i+k}-t_{i+1}}$$

Cubic splines (i.e., of order k=4) are applied to ensure that there is the necessary flexibility in parametrized shapes (it should be noted that $B_{j,k}$ takes on an identical form to $B_{i,k}$). Furthermore, given that tag lines and images are of approximately equal distance, uniform B-splines are considered so that the knots are spaced at consecutive integer values of parametric variables.

The above procedure provides a mechanism for tracking points within short-axis image slices by reconstructing only one B-surface per spatial stack of image slices at any one discrete sampling instant in time. However, in MRI, position of image slices are fixed relative to the magnet's coordinate system, and therefore this approach can only yield within short-axis-slice motion of material points. To obtain information about movement of points in the "out-of-plane" direction, a second sequence of images is acquired with the requirement that tag planes intersecting the new slices be in parallel to short axis images. The imaging protocol described above in combination with the specific requirements described in the next paragraph accomplish this goal.

The tag intersections are the material points corresponding precisely to the intersection of three tag planes, and revealing for all time points in the cardiac cycle, 3-D motion of these special points.

Figure 5:
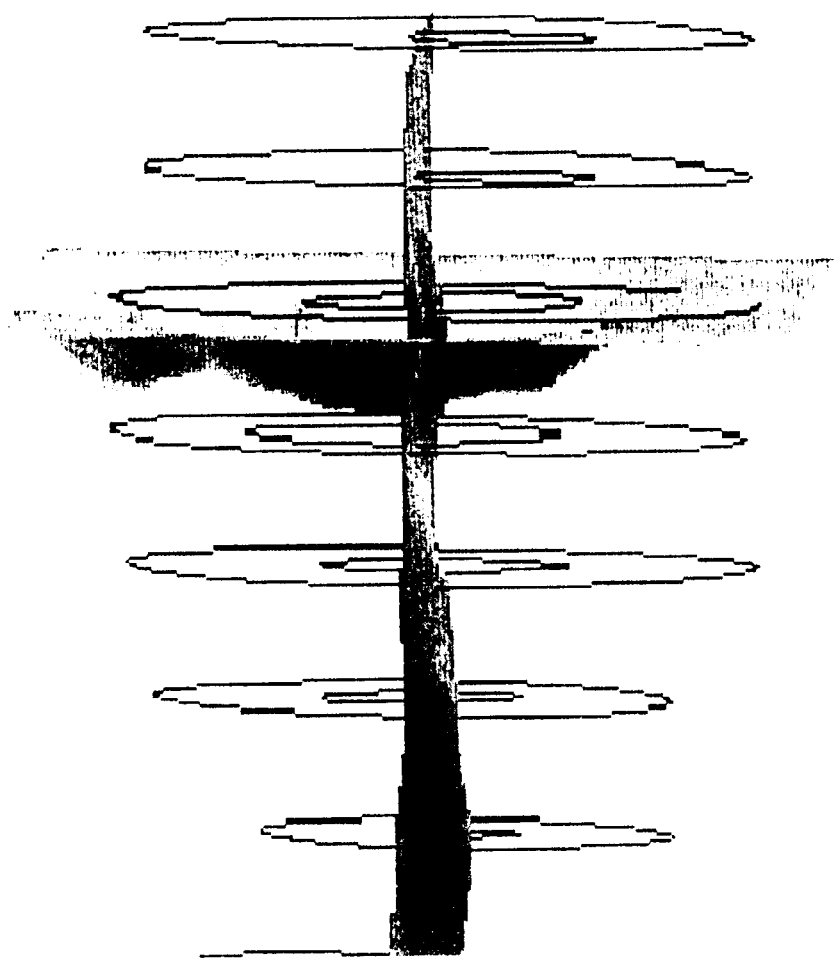
FIG. 5 is a perspective illustration of a B-spline surface representation of a long-axis tag plane reconstructed from a spatial stack of B-splines. "Out-of-plane" movement of the heart is visualized by deviation from flatness of the long-axis B-spline surface.

As in the case of coupled B-snakes of short-axis images, once again deformations of tag planes in the long-axis orientation are measured by creating B-spline surfaces from B-snakes. The difference between short-axis and long-axis image acquisitions is, however, that there is only one set of parallel tag planes intersecting long-axis images. FIG. 5 illustrates a tag surface constructed from a spatial sequence of long-axis images. FIG. 5 is a perspective illustration of a B-spline surface representation of a long-axis tag plane reconstructed from a spatial stack of B-splines. "Out-of-plane" movement of the heart is visualized by deviation from flatness of the long-axis B-spline surface.

Coordinates of material points may be obtained by computing intersections of three intersecting B-spline surfaces representing three intersecting tag surfaces. For each triplet of intersecting B-spline surfaces, ($\vec{S}_1(u_1,v_1)$, $\vec{S}_2(u_2,v_2)$, $\vec{S}_3(u_3,v_3)$), the following computation is carried out $$\min_{\vec{P}_1,\vec{P}_2,\vec{P}_3} d^2(\vec{S}_1,\vec{S}_2) + d^2(\vec{S}_1,\vec{S}_3) + d^2(\vec{S}_2,\vec{S}_3)$$

where point $\vec{P}_i$ belongs to surface $\vec{S}_i$ and d is the Euclidean distance metric. The minimization is carried out using the method of Conjugate Gradient Descent which insures fast convergence of the method. Note that the overall distance function above can be written as $$\|\vec{S}_1(u_1,v_1)-\vec{S}_2(u_2,v_2)\|^2 + \|\vec{S}_2(u_2,v_2)-\vec{S}_3(u_3,v_3)\|^2 + \|\vec{S}_1(u_1,v_1)-\vec{S}_3(u_3,v_3)\|^2$$

with the goal of finding the parameters $(u_i,v_i)$ for the triplet of surfaces. The computed parameters will in fact be surface parameters of the intersection point. For the iterative optimization process, a good initial set of parameters has been found to be parameters of the intersection point assuming linear B-spline bases. The algorithm has been employed on an image sequence which includes 17 slices and 19 frames (17×19 images) yielding temporal positions of around 250 material points over the heart cycle. In a movie of these material points, the 3-D motion of individual myocardial points is clearly apparent.

Figure 6A:
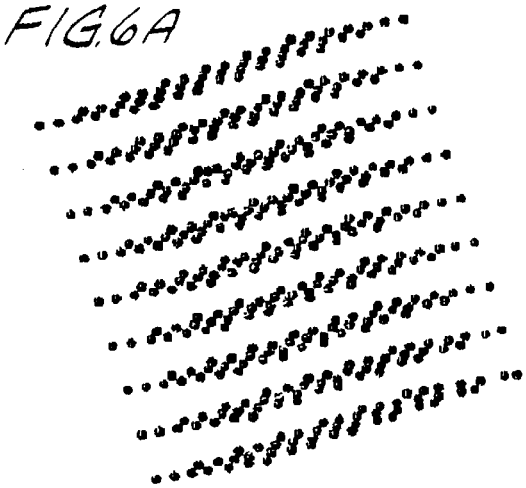
FIGS. 6A–6C are perspective illustrations of the movement of material points of the left ventricle of the heart from diastole to one-third through systole.
Figure 6B:
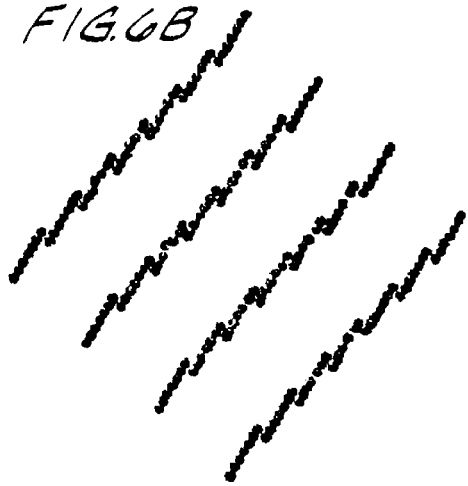
Figure 6C:

FIGS. 6A–6C show results of the intersection computation for a few material points and are perspective illustrations of the movement of material points of the left ventricle (LV) of the heart from diastole to one-third through systole. FIG. 6A shows the initial 3-D location of material points shown on every second slice of the MRI data. FIG. 6B shows the location of the material points for every fourth slice of the MRI data. FIG. 6C shows the new computed location of material points one-third through systole. In combination, these FIGS. 6A–6C illustrate the non-rigid motion of material points of the heart and indicate that points further up in slices (around the base) move downward, whereas points near the heart's apex are relatively stationary.

In another method of the invention, dense tissue deformations between two arbitrary frames in a sequence of tagged images are reconstructed using smoothing splines. A thin-plate spline is a type of smoothing spline. First, the location of tag lines must be determined in two frames of imaging data with coupled B-snake grids. Then, dense deformations are obtained. In other words, a method for warping a first area in a first image slice of imaging data into a corresponding second area in a second image slice of imaging data successive in time to interpolate a dense displacement vector field using smoothing splines, said imaging data containing tag lines comprises the steps of:

finding coordinates of the tag lines in both slices of imaging data; and reconstructing a dense displacement vector field with smoothing splines using coordinates of the tag lines.

Coupled snake grids are a sequence of spatially ordered snakes, represented by B-spline curves, which respond to image forces, and track non-rigid tissue deformations from SPAMM data. The spline grids are constructed by having the horizontal and vertical grid lines share control points. By moving a spline control point, the corresponding vertical and horizontal snakes deform. This representation is reasonable since the point of intersection of two tag lines is physically the same material point, the tissues are connected, and furthermore through shared control points, a more efficient representation is achieved.

A MN spline grid is defined by $\{(M \times N)-4\}$ control points which are may be represented by the set:

$$\{\{\vec{P}_{12}, \vec{P}_{13}, \ldots, \vec{P}_{1,N-1}\}, \{\vec{P}_{21}, \vec{P}_{22}, \ldots, \vec{P}_{2,N}\}, \ldots, \{\vec{P}_{M,2}, \vec{P}_{M,3}, \ldots, \vec{P}_{M,N-1}\}\}$$

where $\vec{P}_{ij}$ is the spline control point at row i and column j.

To detect and localize SPAMM tag lines, grid locations are optimized by finding the minimum intensity points in the image, as tag lines are darker than surrounding tissues. However, there is an additional energy term present in the formulation which takes account of the local 2-D structure of image intensity values at tag intersections. Although an exact correspondence for points along a tag line cannot be specified, the exact correspondence for points at tag intersections is known—assuming 2-D motion for the LV. This is the familiar statement of aperture problem in image sequence analysis. The way to incorporate this familiar knowledge into the algorithm and therefore distinguish between 1D and 2-D tagged points is to utilize the SSD (sum-of-squared-differences) function in the minimization $$\varepsilon(\vec{p}_{12}, \ldots, \vec{p}_{M,N-1}) = \beta_1 \sum_k \int I(\vec{\alpha}_k(u)) du + \beta_2 \sum_{ij} \int SSD(v_{ij})$$

where I is the image intensity function, $\vec{\alpha}_k$ denotes the intersection point on the pixel grid of snake curves, $\beta_1$ and $\beta_2$ are preset constraints. The SSD function determines the sum-of-squared-differences of pixels in a window around point $v_{ij}$ in the current frame (with intensity function I) with a window around the corresponding B-snake grid intersection in the previous frame (with intensity function J). That is, when the location of the grid in I is sought $$SSD(v_{ij}) = \sum_{i=1}^{K} (I(q_i) - J(q_i'))^2$$

for corresponding locations $q_i$ and $q_i'$ in an image window with K total pixels. In order to minimize the discretized version of $\varepsilon$, in each iterative step, the gradient of $\varepsilon$ with respect to $\vec{P}_{ij}$ is computed, a line search in the $\nabla \varepsilon$ direction is performed, the control points to the minimum location (which will result in real values for $\vec{P}_{ij}$) are moved, and the procedure is continued until the change in energy is less than a small number, defining convergence. It is helpful to note that with $\vec{P}_{ij}=(x_{ij},y_{ij})$, the gradient of ($\varepsilon$) may be computed as follows:

$$\frac{d\varepsilon}{dx_{ij}} \cong \frac{\varepsilon(\vec{p}_{12}, \ldots, (x_{ij}+\Delta x, y_{ij}), \ldots, \vec{p}_{M,N-1}) - \varepsilon(\vec{p}_{12}, \ldots, (x_{ij}, y_{ij}), \ldots, \vec{p}_{M,N-1})}{\Delta x}$$

$$\frac{d\varepsilon}{dy_{ij}} \cong \frac{\varepsilon(\vec{p}_{12}, \ldots, (x_{ij}, y_{ij}+y\Delta), \ldots, \vec{p}_{M,N-1}) - \varepsilon(\vec{p}_{12}, \ldots, (x_{ij}, y_{ij}), \ldots, \vec{p}_{M,N-1})}{\Delta y}$$

In practice, there may be an additional constraint in computing the energy function: only the intersections and points on the snake grid which lie on the heart tissue are used. To track the grid over multiple frames, the localized grid for the current temporal frame becomes the initial grid for the next frame, which is then optimized on the new data.

Tracking tissue deformations with SPAMM using snake grids provides 2-D displacement information at tag intersections and 1D displacement information along other 1D snake points. The displacement measurement from tag lines however are sparse; interpolation is required to reconstruct a dense displacement field from which strain, torsion, and other mechanical indices of function can be computed at all myocardial points. The location of all myocardial points between two frames of imaging data can be displayed to reveal motion of the myocardium. This describes an efficient solution for reconstructing a dense displacement vector field using localized coordinates of tag positions. It assumes only 2-D motion (as is roughly the case towards the apical end of the heart).

To proceed more formally, the vector field continuity constraint is the bending energy of a thin-plate which is applied to the x and y component of the displacement field $(u(x,y),v(x,y))$ $$\Phi_1 = \int \int u_{xx}^2 + 2u_{xy}^2 + u_{yy}^2 dxdy + \int \int v_{xx}^2 + 2v_{xy}^2 + v_{yy}^2 dxdy \qquad (6)$$

This serves as the smoothness constraint on the reconstructed vector field, characterizing approximating thin-plate splines.

With intersection "springs" in place, the intersections of two grids are "pulled" towards one another by minimizing $$\Phi_2 = \sum (u - u_{int})^2 + (v - v_{int})^2 \qquad (7)$$

In Eq. (7), $u_{int}$ and $v_{int}$ are the x and y components of displacement at tag intersections as well as intersections of myocardial contours with tag lines.

Assuming 2-D tissue motion, a further physical constraint is necessary: any point on a snake in one frame must be displaced to lie on its corresponding snake in all subsequent frames. This constraint is enforced by introducing a sliding spring. One endpoint of the spring is fixed on a grid line in the first frame, and its other endpoint is allowed to slide along the corresponding snake in the second frame, as a function of iterations. Next, minimize $$\Phi_3 = \sum \{(x+u-\bar{x})^2 + (y+v-\bar{y})^2\} \qquad (8)$$

along 1D snake points. In the above equation, (x,y) are the coordinates of a point on the snake in the current frame, and $(\bar{x}, \bar{y})$ is the closest point to (x+u, y+v) on the corresponding snake in the second frame.

An optimization function can be obtained by a linear combination of the three terms in Eqs. (6)–(8). There are two fundamentally different approaches to the minimization of this function, namely, finite elements and finite differences. The method of finite elements involves guessing the form of the solution (a continuous function or a combination of continuous functions) and then calculating the parameters of this function. The implementation of a finite elements method is usually very fast since there are few parameters to be calculated. However, in many cases, the presumption about the form of the solution may be too restrictive. The finite differences approach on the other hand needs no such initial guess. But this method yields the values of the solution only at selected grid points—values at points in between need to be interpolated. Often, the values have to be calculated at a large number of grid points and in these cases, the finite difference algorithms are slower.

Only finite difference techniques are considered. Finite element methods are omitted for the following discussion. Again, there are a number of ways to proceed. Preferably, a quadratic approximation to the optimization function is found and then a conjugate gradient or quasi-Newton algorithm is used to minimize this quadratic approximation. The reason of course is that quasi-Newton algorithms have quadratic convergence properties for functions which are almost quadratic.

Let $(u(x,y),v(x,y))$ be the displacement field as before. The objective function $\Phi(u,v)$ which needs to be minimized is the linear combination $$\Phi = \lambda_1 \Phi_1 + \lambda_2 \Phi_2 + \lambda_3 \Phi_3 \quad (9)$$

Note that $\bar{x}$ and $\bar{y}$ are dependent on $u$ and $v$, respectively, which makes the function $\Phi_3(u,v)$ nonquadratic. The Euler-Lagrange equations can be derived for the variational problem in Eq. (9) and the resulting system of equations is solved. In a more efficient approach, one can straightaway discretize the function $\Phi$ in Eq. (9). Assuming the distance between two adjacent grid points to be $$u_{i+1,j} - u_{i,j} = u_{i,j+1} - u_{i,j} = h \quad (10)$$

the second-order partial derivatives $(u_{xx})_{ij}, (u_{xy})_{ij}$, and $(u_{yy})_{ij}$, at the point $(i,j)$ can be approximated by $$(u_{xx})_{ij} \cong \frac{u_{i+1,j} - 2u_{i,j} + u_{i-1,j}}{h^2}$$

$$(u_{xy})_{ij} \cong \frac{u_{i+1,j+1} - u_{i+1,j} + u_{i,j+1} + u_{i,j}}{h^2}$$

$$(u_{yy})_{ij} \cong \frac{u_{i,j+1} - 2u_{i,j} + u_{i,j-1}}{h^2}$$

The discrete form of the function $\Phi_1$ can be obtained by substituting the discrete derivatives into the first equation in Eq. (6). The partial derivatives of $\Phi_1$ can be calculated using the computational molecule approach though special attention should be paid in computing the molecules near the endocardial and epicardial boundaries where the smoothness constraint should break in order not to smooth over the motion discontinuity. The discretization of the function $\Phi_2$ and calculation of its partial derivatives is almost trivial. Consider the function $\Phi_3$ which is nonquadratic. The partial derivatives of $\Phi_3$ are $$(\Phi_3)_u = (u+x-\bar{x})(1-\bar{x}_u) + (v+y-\bar{y})(-\bar{y}_u)$$

$$(\Phi_3)_v = (v+y-\bar{y})(1-\bar{y}_v) + (u+x-\bar{x})(-\bar{x}_v)$$

For simplification, two approximations may be made. For vertical grid lines, the x-coordinates of curves only vary slightly, and as the vertical lines are spatially continuous, $\bar{x}_u$ is expected to be small. Furthermore, for vertical lines $\bar{y}$ changes minutely as a function of $u$, so that $\bar{y}_u \approx 0$. For horizontal grid lines, the y coordinates of curves also vary slightly along the length of the lines, and since these are spatially continuous curves, $\bar{y}_u$ is expected to be small. Note that these approximations will hold under smooth local deformations, as is expected in the myocardial tissue. Only $\bar{x}_u$ for horizontal grid lines, and $\bar{y}_v$ for vertical grid lines is expected to vary more significantly. The approximate derivatives are now given by $$(\Phi_3)_u \cong (u+x-\bar{x})(1-T_{hor}\bar{x}_u)$$

$$(\Phi_3)_v \cong (v+y-\bar{y})(1-T_{ver}\bar{y}_v)$$

The variables $T_{hor}$ and $T_{ver}$ are predicates equal to one if the snake point of interest lies on a horizontal, or a vertical grid line. Needless to say, the above functions can be discretized by replacing the continuous values by the corresponding values at the grid points.

After discretization, a typical quadratic optimization problem takes the following form $$f(x) = c - b^T x + \tfrac{1}{2} x^T A x$$

where x is the vector of variables, A is the constant Hessian matrix of second-order partial derivatives, and b and c are constant vectors. In the present problem, the terms $\Phi_1$ and $\Phi_2$ can be cast in the above form. Unfortunately, in the term $\Phi_3$, the values $\bar{x}$ and $\bar{y}$ are dependent on x and y, respectively, which makes $\Phi_3$ nonquadratic. The discrete optimization function form of $\Phi_3$ is given by $$\Phi(x) = c - b^T x + \tfrac{1}{2} x^T A x + \lambda_3 \Phi_3(x) \quad (11)$$

where A, b, and c are constants and include the contributions from $\lambda_1 \Phi_1$ and $\lambda_2 \Phi_2$. Specific minimization algorithms may now be considered.

Figure 7:
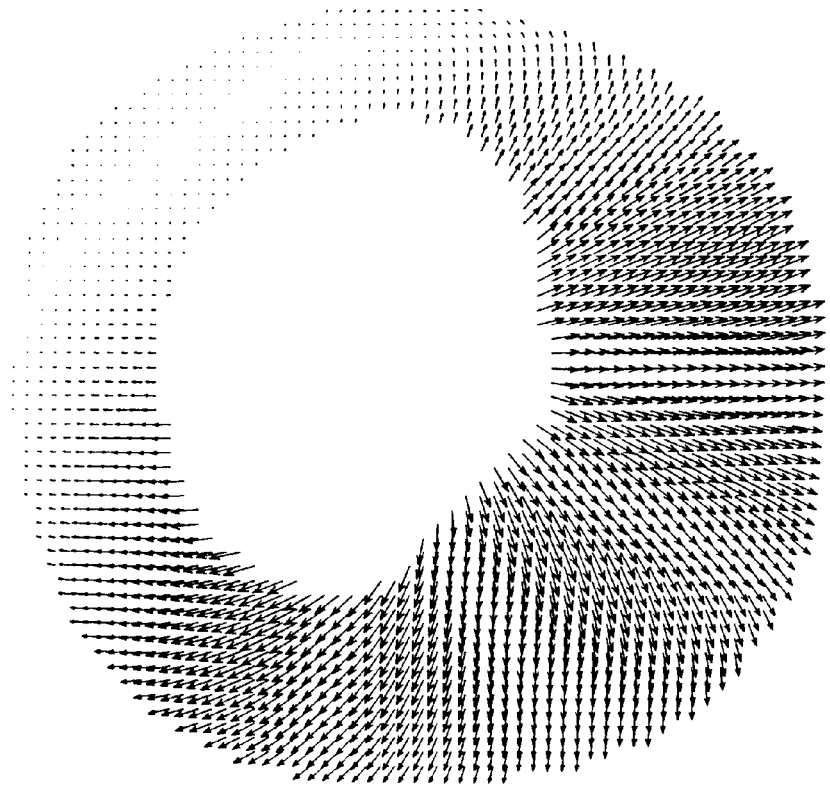
FIG. 7 illustrates one display of a sequence of displacement vector fields of the left ventricle from a sequence of 2D image slices with smoothing spline warps during systole.

FIG. 7 illustrates one display of a sequence of displacement vector fields of the left ventricle during systole. FIG. 7 shows that segmental motion of all myocardial points can easily be quantitated and visualized from the location, direction and length of the displayed vectors. An akinetic area in the upper left area is indicated.

In the warping method, the step of reconstructing the dense displacement vector field comprises the steps of:

assigning an arbitrary vector field to the first grid of the first image slice;

warping the second grid onto the first grid by applying the vector field to the second grid to create a warped grid from the second grid;

comparing the warped grid to the first grid; and redefining the vector field to minimize any errors found in the comparing step; whereby the first grid of the first image slice is undeformed or deformed, and the second grid of the second image slice is deformed or undeformed, respectively.

The first algorithm investigated is the CG algorithm. For an order-N quadratic problem, the CG algorithm is guaranteed to converge in N iterations. Moreover, it does not store the Hessian matrix and requires o(N) storage for an order-N optimization problem. Note that the CG algorithm does not explicitly calculate or store the Hessian matrix A and can be adapted to the function $\Phi$ in Eq. (11). The Hessian matrix for $\Phi$ is not known. However, the derivative $\nabla \Phi(p)$ can be calculated using the derivatives for the functions $\Phi_1, \Phi_2$, and $\Phi_3$. This knowledge of the gradient of $\Phi$ is used in the implementation of the CG algorithm. As a final point, since Φ is non-quadratic, the algorithm may not converge in N iterations.

The CG algorithm is basically a form of steepest-descent algorithm, except for the fact that the descent directions are chosen very efficiently. The following sequence of operations are performed for the objective function. First, initialize the solution vector $x_0$. Let $g_0=h_0=-\nabla f(x_0)$ where $h_0$ is the initial descent direction. Second, minimize along the current descent direction $h_i$ and calculate the next solution vector $X_{i+1}$, Third, calculate the vector $g_{i+1}=-\nabla f(x_{i+1})$. Fourth, calculate the next descent direction $h_{i+1}$ using the following formula $$\gamma_i = \frac{(g_{i+1} - g_i) \cdot g_{i+1}}{g_i \cdot g_i}$$

$$h_{i+1} = g_{i+1} + \gamma_i h_i$$

Fifth, check the termination criterion. Thereafter, return to the second step if necessary.

Quasi-Newton algorithm is another different optimization method that has been investigated. It differs from CG in that it has higher memory requirements but better convergence properties for non-quadratic functions. Quasi-Newton methods means techniques which use an approximation to the inverse Hessian matrix in each iteration as opposed to Newton methods which use the exact inverse. A generic quasi-Newton algorithm calculates and stores an approximation to the inverse Hessian matrix in each iteration. Hence for an order-N optimization problem, this method needs $o(N^2)$ storage. The advantage of a quasi-Newton algorithm lies in that it has quadratic convergence properties for general smooth functions (not necessarily quadratic). A specific quasi-Newton algorithm is characterized by the approximation it uses for the Hessian matrix. The quasi-Newton method used in this paper is called the Davidon-Fletcher-Powell (DFP) algorithm which is described in the next paragraph.

The DFP is a quasi-Newton method. First, initialize the vector $x_0$, the inverse Hessian $H_0=I$, I being the identity matrix, and the initial descent direction $d_0=-\nabla f(x_0)$. Second, minimize the function along the current direction $d_i$ and calculate $x_{i+1}$. Third, update the inverse Hessian matrix $H_{i+1}$ at the point $x_{i+1}$ according to the following $$H_{i+1} = H_i + \text{correction}$$

Fourth, calculate the next descent direction $d_{i+1}$ using $$d_{i+1} = -H_{i+1} \cdot (\nabla f(x_{i+1}))$$

Fifth, check the termination criterion. Thereafter, return to the second step, if necessary.

While particular embodiments of the invention have been shown and described, it will be obvious to those skilled in the art that various changes and modifications may be made without departing from the present invention in its broader aspects. It is intended that all matter contained in the above description and shown in the accompanying drawings shall be interpreted as illustrative and not in a limiting sense.

What is claimed is:

1. A method for tracking motion of tissue in three or more dimensions by obtaining a model of the tissue from imaging data from which a grid of control points may be defined, said imaging data comprising a temporal sequence of frames and having tag planes, said method comprising the steps of:

calculating knot planes for each frame in the temporal sequence from the grid of control points of the imaging data;

fitting the knot planes to the tag planes simultaneously for all frames in the temporal sequence to obtain the model of the tissue; and representing motion of tissue in three dimensions over time with the model of the tissue.

2. The method of claim 1 wherein the step of calculating knot planes comprises calculating three orthogonal sets of knot planes and the step of fitting the knot planes to the tag planes comprises fitting the three orthogonal sets of knot planes to three orthogonal sets of tag planes.

3. The method of claim 1 wherein the step of representing motion of tissue comprises deriving a displacement vector field from the model of the tissue.

4. The method of claim 3 wherein the displacement vector field is three-dimensional and projected normally onto a two-dimensional plane for viewing.

5. The method of claim 3 further comprising the step of deriving indicators of tissue function from the displacement vector field.

6. The method of claim 5 wherein the step of deriving indicators of tissue function comprises deriving tissue strain.

7. The method of claim 1 wherein the step of representing motion of tissue comprises displaying material points from the image data.

8. The method of claim 1 wherein the imaging data is acquired at a time t1 and a subsequent time t2, and wherein the step of representing motion of tissue occurs at any instant in the time interval beginning with time t1 and ending with time t2.

9. The method of claim 8 wherein the step of representing motion of tissue comprises deriving a displacement vector field from the model, and the method further comprises deriving indicators of tissue function from the displacement vector field from the model.

10. The method of claim 9 wherein the step of deriving indicators of tissue function comprises deriving tissue strain.

11. The method of claim 1 wherein the imaging data is obtained by imaging the tissue along a first axis and along a second axis orthogonal to the first axis.

12. The method of claim 1 wherein the imaging data comprises Images of a left ventricle of a human heart.

13. The method of claim 1 further comprising the steps of:

determining a first model at a first time;

determining a second model at a second time; and generating indicators of tissue motion by comparing the first model with the second model.

* * * * *